(No Model.)

J. BRINKERHOFF.
LOCK NUT.

No. 497,702. Patented May 16, 1893.

Witnesses.
G. A. Tauberschmidt.
Jessie D. Kingsbury.

Inventor.
Jacob Brinkerhoff
by
Whitaker Prevost
attys.

UNITED STATES PATENT OFFICE.

JACOB BRINKERHOFF, OF AUBURN, NEW YORK.

LOCK-NUT.

SPECIFICATION forming part of Letters Patent No. 497,702, dated May 16, 1893.

Application filed January 25, 1893. Serial No. 459,670. (No model.)

*To all whom it may concern:*

Be it known that I, JACOB BRINKERHOFF, a citizen of the United States, residing at Auburn, in the county of Cayuga and State of New York, have invented certain new and useful Improvements in Bolts and Nuts; and I do hereby declare the following to be a full, clear, and exact description of the invention, such as will enable others skilled in the art to which it appertains to make and use the same.

My invention relates to nut locks, and it consists of an improvement in the construction of the same, which is illustrated in the accompanying drawings and fully described in the following specification and claims.

My object is to produce a practical and effectual automatic nut lock by the use of only a screw threaded bolt and bolt nut, and to this end I so construct and connect the two that any backward movement of the nut is impossible, except upon the application to it of great force, for the purpose of turning it backward. This may be accomplished by various constructions, under one of which when the nut is put to the practical use on a bolt, for which it is designed, the sharp edges of the screw threads on the outer end of the bolt are turned over into the adjacent grooves between the screw threads, whereby any backward movement of the nut will be resisted and the nut locked in its position on the bolt. Under another construction when the nut is put to practical use, right and left hand threads are opposed and come in contact with the result that the sharp edges of each will be forced over into adjacent grooves preventing the backward movement of the nut under the jarring or shaking of heavy machinery. The reverse or left hand screw threads are by the action of moving it to place, seated in such engagement with their opposed threads that on the backward movement of the nut they tend to carry the nut forward on the bolt and in this way assist in retaining the nut in position.

Figure 1:
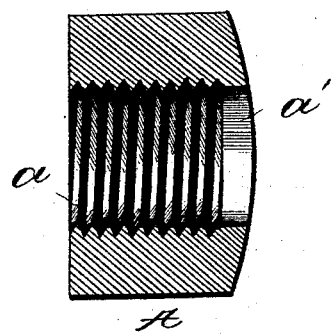
Figure 2:
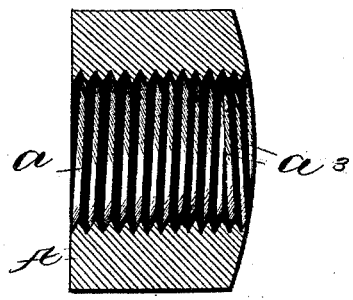
Figure 3:
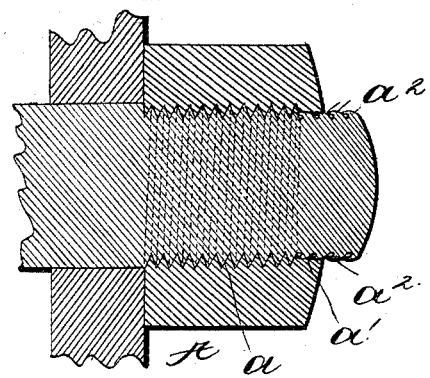

In the drawings Figure 1 is a sectional view of one form of bolt nut made in accordance with my invention. Fig. 2 is a sectional view of a modified form of a bolt nut. Fig. 3 is a sectional view of nut and threaded end of a bolt with the nut shown in Fig. 1 screwed into place and locked upon it.

The nut A shown in Fig. 1 is provided with an opening through the body portion and a part thereof is provided with screw threads $a$ in the usual manner. Adjacent to the outer end of the nut the interior wall at $a'$ is left plain without threads of any kind and this portion is cut away for a distance equal to a part of the height of the screw threads of the other portion $a$ increasing the free or clear diameter at that point.

In the construction illustrated in Fig. 2 the nut A is provided with an aperture of a substantially uniform diameter and this is threaded throughout the greater part of its extent in like manner as in the nut shown in Fig. 1. Instead of leaving the remaining portion of the aperture of the nut unthreaded, I provide a corresponding portion of the aperture with reverse threads $a^3$. Both constructions of nut are to be used with a bolt having its threads all of one direction.

In Fig. 3 the method of locking the nut is illustrated showing that the turning of the nut to the position desired results in turning the thinner edges of the threads over into the adjacent grooves between the threads as shown at $a^2$ whereby sufficient obstruction to the backward movement of the nut is created to lock the nut in the position desired no matter to how great jarring or other loosening influences it may be subjected. But while it is thus securely held in position the nut can be removed by application of extraordinary force by a powerful wrench. The force required will approximate that required to cut threads on the bolt the same distance.

In putting the nut shown in Fig. 2 into practical use, the reverse threads near the outer end of the nut engage the outer threads of the bolt and the threads of the bolt are turned over in approximately the same manner as when the nut shown in Fig. 1 is employed. In addition the reverse threads engage each other in such a way that they may be said to interlock with the result that on a retrograde movement of the nut such engagement will tend to force the nut toward the head of the bolt. In case it is desired to remove the nut from the bolt in this construction it can be done by the application of great force. In employing either of these constructions on removing the nut as herein described the threads of the bolt will be found mutilated for a short distance from the end of the bolt but they will be of sufficient height to engage with the regular threads of the nut if it is desired to replace the same upon the bolt.

What I claim, and desire to secure by Letters Patent, is—

1. A bolt nut provided near its outer end with means for turning the sharp edges of the threads of the bolt over into the grooves between the threads, thereby causing resistance to any backward movement of the nut and locking it in its position on the bolt, substantially as described.

2. The combination of a bolt and nut, one of said parts being provided with right and left hand threads, whereby when the nut is turned to the point desired reverse threads will be caused to engage and interlock with each other within the aperture or bore of the nut thereby locking the nut, substantially as described.

3. A bolt nut having the described uniformity of diameter, of aperture or bore, a portion of said aperture or bore being provided with screw threads to engage the screw threaded portion of a bolt and having the remaining portion of said aperture or bore reversely threaded, substantially as described.

4. The combination with a screw threaded bolt, of a nut having threads engaging corresponding threads of the bolt and reverse threads engaged and interlocked with the threads of the bolt, substantially as described.

5. A bolt nut having throughout the greater part of its aperture or bore threads for engaging the threads of the bolt, and near its outer end reverse threads for impinging upon and turning the thin edges of the bolt threads over into the grooves between adjacent threads and interlocking with them, substantially as described.

6. A screw threaded bolt and bolt nut some of the threads on the bolt regularly engaging corresponding threads on the nut and the sharp edges of other bolt threads turned over into the adjacent grooves between the threads, substantially as described.

7. A bolt in combination with a bolt nut, the two being connected together at one end of the aperture or bore of the nut and within the same by corresponding screw threads and at the other end of said aperture or bore and within the same, by right and left hand screw threads engaged or interlocked with each other, substantially as described.

In testimony whereof I affix my signature in presence of two witnesses.

JACOB BRINKERHOFF.

Witnesses:
J. H. WHITAKER,
JESSIE D. KINGSBERY.